UNITED STATES PATENT OFFICE.

MICHAEL A. POPKESS, OF KANSAS CITY, MISSOURI, ASSIGNOR TO BITUMINIZED ROAD COMPANY, A CORPORATION OF ARIZONA.

PLASTIC MATERIAL AND PROCESS OF MAKING SAME.

1,320,709. Specification of Letters Patent. Patented Nov. 4, 1919.

No Drawing. Application filed April 9, 1917, Serial No. 160,837. Renewed September 16, 1919. Serial No. 324,219.

*To all whom it may concern:*

Be it known that I, MICHAEL A. POPKESS, a citizen of the United States, residing at Kansas City, in the county of Jackson and State of Missouri, have invented certain new and useful Improvements in Plastic Materials and Processes of Making Same, of which the following is a specification.

This invention relates to plastic materials and processes of making same; and it comprises a brick, or block, a roadway or other shaped article made of assembled fragments of rigid mineral material constituting the bulk of said article, with the voids between the fragments filled with a particular plastic composition made of intimately incorporated bitumen and fine mineral material, such mineral matter being dust-like in its fineness, and the proportion of mineral matter being such as to cause the composition to be hard but somewhat malleable and plastic, but inseparable and non-flowing by the action of temperature changes, such finely divided mineral matter being most advantageously a clay having its particles in substantially the same relation as they exist in a natural "deflocculated" soil; and it further comprises a method of making bricks, road surfaces and other shaped articles wherein fragments of mineral matter of a rigid and hard nature are assembled in a mechanically strong assemblage or aggregate together with a composition of fine dust-like mineral matter with incorporated bitumen in the quantity which will render the composition hard, dense and strong but somewhat malleable and plastic, such composition being used in an amount about equivalent to the minimum voids between the fragments, said fragmentary mineral matter and said composition being assembled together and compacted into form under heavy pressure; all as more fully hereinafter set forth and as claimed.

It has heretofore proved difficult to make bricks and other structural shapes of any fragmentary material with asphalt as a binder. This is for the reason that relatively large voids exist between the fragments, and since asphalt, even the hardest varieties, is more or less fluent, that is tends to flow, and becomes more fluent with an increase in temperature, it was impossible to keep the bodies or "lakes" of asphalt between the fragments from flowing or changing their position, permitting relative movement of the mineral matter. The use of asphalts normally liquid at atmospheric temperature in such relation was of course wholly precluded since they would flow out. The commercial asphalts have this tendency to flow even where, as in the case of asphalts such as Trinidad, they contain considerable mineral matter or ash. They are all material which will, or can be made to, flow. Under sufficient pressure even the hardest asphalt will flow, and time and degree of pressure are in some measure reciprocal. Increase in temperature always increases the flow. The only blocks made with asphalt as a binder with any measure of commercial success are those using a very hard asphalt and with sufficient pressure to crush the aggregate into close assemblage, obviating voids and reducing the thickness of the cementing asphalt films to the lowest possible degree. Pressures of hundreds of tons are necessary and the process is only applicable to rocks of low crushing strength, the object being to get rid of voids by the use of sufficient mechanical pressure to smash the rock fragments together in locking relation. The process cannot be used with ordinary sand and gravel.

For similar reasons, the use of asphalt in paving work has not been as successful as it should be. In making an asphalt roadway, it is the custom to provide first a solid and rigid underbody or foundation, usually of concrete. Attempts to use the natural soil, even in a previously existing macadam roadway, have not afforded the necessary solidity and stability. On this base is built up an assemblage of rock fragments (gravel is less satisfactory) and sand, the fragments and sand being so arranged that as far as possible the amount of voids is reduced to a minimum. To reduce the amount of voids still further, it is often the custom to use the fragments of rock in graded size together with sand and gravel. The effort is to make a structure of rock fragments, sand and gravel in which the bodies of mineral matter shall have mutual support or locking engagement, the structure having "inherent" stability. Reliance is placed on the rigidity of the fragments and their engagement with each other to resist all, or most, of the stresses and strains of traffic. With this prepared roadway is used one of the ordinary solid or semisolid asphalts in such a manner that it may flow into and fill up the voids unavoidably existing; this being for the double purpose of cementing the fragments of sand together in their predetermined positions and of water-proofing or filling up the voids. Liquid asphalt is not used for this type of paving for the reason that it would simply flow away and be lost. But with even the solid or semisolid asphalts under summer temperatures, there is a tendency to flow, resulting in the gradual creation of spaces or voids, permitting the mutual movement of the fragments of aggregate. The fragments of aggregate left free to move, tend to grind each other under traffic. And even where the flow of asphalt is not great, the flow may still be sufficient to permit movement of the fragments of the aggregate enough to make the road wave or undulate or develop ruts and holes.

In the blocks and in the pavements alike, it will be noted that the difficulty with asphalt is its tendency to flow. I have found that by using instead of asphalt an asphalt composition with enough very finely divided mineral matter incorporated therein to make it non-flowing I can avoid the noted difficulties and secure new advantages; that I can make permanent, hard and rigid blocks even from sand and gravel at low pressures, while I can provide roadways which are permanent under temperature changes. In making blocks of this material only enough pressure is necessary to deform the stated asphalt composition and make it fill the voids; it is not necessary to use pressure enough to crush the gravel or rock itself.

In a number of other applications I have described and claimed the production of a new type of material for road-making and similar purposes, which, broadly stated, consists of asphalt and an impalpably fine material; the two being assembled in such proportions that, while the composition is malleable enough to tamp and form into place, nevertheless it has sufficient mechanical strength of its own, due to the manner of assemblage of the two materials, to form a hard and dense composition. While the material may be made with various finely comminuted rocky materials of the nature of silica or silicates, I have found that by far the best compositions are made with natural clayey or earthy materials. In earthy materials, the ultimate clay particles exist in a state of fineness almost impossible to obtain by artificial means as in grinding rocky materials. In clay in the natural or "deflocculated" state in which it exists in most soils, the ultimate particles are of almost indefinite fineness. In my prior Patent No. 1,008,433, of November 14, 1911, I have described and claimed a method of making compositions for surfacing roads wherein earthy material is dried and reduced to the finest possible state and is then incorporated with bituminous material. In drying and grinding earth, however, the fineness of all the particles obtained is not as great as that existing in the earthy matter of the soil in its natural or deflocculated condition. In certain other and copending applications (Serial No. 90,391 and Serial No. 136,809), I have described and claimed the manufacture of plastic materials in which the natural great fineness of the clayey matter of the soil is retained in the finished composition by the expedient of substituting asphalt in special ways for the water present in the moist clayey material.

Since the strength and resistant qualities, mechanically considered, of the composition made in these inventions are dependent mainly upon the manner in which the bitumen and the fine mineral matter are assembled instead of upon the consistency of the asphalt or bitumen, I am enabled to use the ordinary liquid asphalts. With proper proportioning of the very fine mineral matter and liquid asphalt, compositions are produced which are dry or substantially so and evince no tendency to lose their asphalt on contact with other materials. In using such liquid asphalts in the present invention, I take care that they shall be as free as may be of volatile constituents. I find that I cannot rely upon the results and the production of the best quality of material with any liquid asphalt containing oil or other constituents volatile in the air.

Much of the change in asphalt in pavements and other relations is probably due to the absorption of oxygen from the air; and the more violent the heating and other operations incident to the manufacture of asphalt, the greater seems to be the tendency for a progressive oxidation of the asphalt with an ultimate hardening and friability. This is one of the reasons why I regard liquid asphalts, as nearly as possible in their natural condition, as advantageous for my purposes.

In a practical embodiment of my invention, I may make an asphalt pavement of an aggregate of sand, gravel or rock fragments or mixtures of the same in much the usual manner, save that I thoroughly disintegrate and mix with the aggregate a sufficient amount of one of the dense and hard but malleable compositions made as described. This takes its place as part of the material dumped on the roadway or compressed into blocks to be put on the road. The composition and the aggregate are thoroughly mixed or stirred together, preferably in a special machine, with or without means for heating, which not only mixes the aggregate but cleans it of all adhering soft material prior to deposit. On now tamping the material on the road into place, the fragmentary mineral matter of the aggregate tends to form the usual locking engagement and relation of the ordinary pavement with the inevitable spaces between the fragments. But in the tamping or rolling, the malleable material so deposited takes the only place available to it, that is in the voids between the fragments of mineral matter. On tamping, the result is a hard, dense and impervious roadway in which, in contradistinction of the usual roadway, instead of the voids being filled with solid or semisolid bitumen which will change in consistency and flow under temperature changes, the voids are filled with the non-flowing, strong composition described. The composition takes its part in the complete structure and contributes to its mechanical strength instead of being merely a hole-filling and cementing material. It performs both these functions, but it does more.

In this embodiment of my invention the roadway is composed of the usual aggregate in the usual relation with the voids filled with the non-flowing composition of very finely divided mineral matter and bitumen; such finely divided mineral being preferably and advantageously a deflocculated clay.

In another embodiment of my invention making structural materials, such as bricks, tile, pipe, etc., I mix the described composition in a finely divided form with sand, gravel or other filler of appropriate size in the appropriate amount; and then stamp or press the whole into the shape desired. In making a mixture, it is generally best to use unusually energetic disintegrating and mixing means. Powerful machinery is desirable in this part of the operation, but stamping or molding can be done under, comparatively, low pressures. One reason for the use of vigorous disintegrating machinery is the desirability of thoroughly cleaning the faces of the mineral aggregate.

I find for the present purposes the earth-bitumen composition may contain about 55 per cent. to 70 per cent. of fine earthy material and about 45 per cent. to 30 per cent. of bitumen. But the percentage of bitumen which is most advantageous is that which will thoroughly waterproof the earthy material and make a substantially non-flowing product. The final composition, however as a whole, that is including the aggregate or coarser materials (stones, rock fragments, etc.) may contain as low as 6 per cent. of bitumen.

It is not necessary to size or grade the aggregate to reduce the voids though this may be done. Ordinarily, in pavements of, say, 3 inches thickness I can use anything from, say, 1.5 inch thickness down to "fines". The sizes of materials used for the aggregate of blocks or the like depends upon the size of block, etc.

While I regard the non-flowing composition herein called the "earth-bitumen" composition as best made with the clayey matters of soil, loam or clay, yet I may use any other very finely divided mineral matter which will give a non-flowing composition when thoroughly mixed with the right amount of asphalt. In using clayey matter, I find that the best results are obtained with the clayey matter of a "deflocculated" consistency. In the natural moist clay, as it exists in most soil and particularly soil not in good tilth, the clay particles are of excessive fineness and are discrete from each other. On treatment with various chemicals, on drying, etc., the ultimate clay particles tend to cohere more or less and produce a "flocculated" material in which the particles are not so fine. The finer the particles the better for the present purposes and I therefore find the deflocculated clays most advantageous.

The exact proportions of mineral matter and bitumen which are best used vary somewhat, the variance however being more because of a variation of the state of subdivision of the fine mineral matter than because of differences in the character of the asphalt. But I regard any composition of fine mineral matter and bitumen in such ratio as to give a malleable or non-flowing composition as within the present invention. With deflocculated clays somewhat more bitumen is necessary for the same consistence than with the relatively coarser dusts made by pulverizing rock, sand or gravel.

The present invention is particularly applicable for the manufacture of hard, permanent and impervious bricks and blocks from sand and gravel with the aid of a non-flowing binder adding to the stability of the mineral aggregate.

In another application, Serial No. 92,704, filed April 21, 1916, I have claimed a somewhat similar composition in which, however, the coarser mineral aggregates are merely embedded in the described hard composition instead of being in mechanical locking engagement with each other as in the present invention.

What I claim is:

1. A shaped article composed of an aggregate of bodies of mineral matter in locking arrangement; said bodies being cemented together by a composition of bitumen and dust-like mineral matter, said composition being malleable, but containing enough of said dust-like matter to render it non-flowing.

2. A shaped article composed of an aggregate of bodies of mineral matter in locking arrangement; said bodies being cemented together by a composition of bitumen and clayey mineral matter, said composition being malleable, but containing enough of said clayey mineral matter to render it non-flowing.

3. A shaped article composed of an aggregate of bodies of mineral matter in locking arrangement; said bodies being cemented together by a composition of bitumen and deflocculated clay, said composition being malleable, but containing enough of said deflocculated clay to render it non-flowing.

4. A shaped article composed of an aggregate of bodies of mineral matter in locking arrangement; said bodies being cemented togethed by a composition of liquid bitumen and deflocculated clay, said composition being malleable, but containing enough of said deflocculated clay to render it non-flowing.

In testimony whereof, I affix my signature hereto.

MICHAEL A. POPKESS.

Witness:
J. EDGAR BLACK.